US009918098B2

(12) United States Patent
Eckart et al.

(10) Patent No.: US 9,918,098 B2
(45) Date of Patent: Mar. 13, 2018

(54) MEMORY MANAGEMENT OF MOTION VECTORS IN HIGH EFFICIENCY VIDEO CODING MOTION VECTOR PREDICTION

(71) Applicant: NVIDIA CORPORATION, Santa Clara, CA (US)

(72) Inventors: Stefan Eckart, Munich (DE); Yu Xinyang, Shanghai (CN)

(73) Assignee: NVIDIA Corporation, Santa Clara, CA (US)

( * ) Notice: Subject to any disclaimer, the term of this patent is extended or adjusted under 35 U.S.C. 154(b) by 507 days.

(21) Appl. No.: 14/161,989

(22) Filed: Jan. 23, 2014

(65) Prior Publication Data
US 2015/0208075 A1    Jul. 23, 2015

(51) Int. Cl.
| | |
|---|---|
| *H04N 19/176* | (2014.01) |
| *H04N 19/513* | (2014.01) |
| *G06F 12/02* | (2006.01) |
| *G06F 17/30* | (2006.01) |
| *H04N 19/433* | (2014.01) |
| *H04N 19/52* | (2014.01) |
| *H04N 19/43* | (2014.01) |

(52) U.S. Cl.
CPC .......... *H04N 19/433* (2014.11); *H04N 19/43* (2014.11); *H04N 19/52* (2014.11)

(58) Field of Classification Search
None
See application file for complete search history.

(56) References Cited

U.S. PATENT DOCUMENTS

| | | | | |
|---|---|---|---|---|
| 2006/0140277 A1* | 6/2006 | Ju | .................. | H04N 19/426 375/240.25 |
| 2008/0215644 A1* | 9/2008 | Beric | .................. | G06T 1/60 |
| 2013/0329007 A1* | 12/2013 | Zhang | .................. | H04N 19/513 348/43 |
| 2013/0329797 A1* | 12/2013 | Sugio | .................. | H04N 19/00721 375/240.15 |
| 2015/0312588 A1* | 10/2015 | Yamamoto | ........... | H04N 19/105 375/240.15 |

* cited by examiner

*Primary Examiner* — Dave Czekaj
*Assistant Examiner* — Alison Slater
(74) *Attorney, Agent, or Firm* — Artegis Law Group, LLP (57) ABSTRACT

In the claimed approach, a high efficiency video coding codec optimizes the memory resources used during motion vector (MV) prediction. As the codec processes block of pixels, known as coding units (CUs), the codec performs read and write operations on a fixed-sized neighbor union buffer representing the MVs associated with processed CUs. In operation, for each CU, the codec determines the indices at which proximally-located "neighbor" MVs are stored within the neighbor union buffer. The codec then uses these neighbor MVs to compute new MVs. Subsequently, the codec deterministically updates the neighbor union buffer—replacing irrelevant MVs with those new MVs that are useful for computing the MVs of unprocessed CUs. By contrast, many conventional codecs not only redundantly store MVs, but also retain irrelevant MVs. Consequently, the codec reduces memory usage and memory operations compared to conventional codecs, thereby decreasing power consumption and improving codec efficiency.

20 Claims, 6 Drawing Sheets

FIG. 5B

MEMORY MANAGEMENT OF MOTION VECTORS IN HIGH EFFICIENCY VIDEO CODING MOTION VECTOR PREDICTION

BACKGROUND OF THE INVENTION

Field of the Invention

Embodiments of the present invention relate generally to video coding and, more specifically, memory management of motion vectors in high efficiency video coding motion vector prediction.

Description of the Related Art

In a typical video system, a video coder/decoder (codec) is a hardware unit or software that encodes or decodes digital video information to facilitate efficient transmission of a video while preserving acceptable video quality. To ensure the integrity of the video information, the video coding algorithms used to decode the video should be compatible with the video coding algorithms used to encode the video. And to facilitate compatibility, such algorithms are described by video coding standards that are implemented in both video coders and video decoders. For instance, many Blu-ray Discs include video information encoded in Advanced Video Coding (AVD or H.264) standard, and compatible Blu-ray players include video decoders that are capable of decoding AVC video information. Increasingly, advanced video systems incorporate support for a relatively recent standard, known as High Efficiency Video Coding (HEVC or H.265), that is designed to improve compression efficiency compared to AVD.

As is well known, a video includes a sequence of image frames, and a typical codec is designed to compress the video information based on eliminating redundancy across image frames spatially and/or temporally. Many codecs, including AVD codecs and HEVC codecs, implement compression/decompression algorithms that store the differences between sequential image frames instead of storing all of the information included in each image frame. These differences are referred to as "motion vectors," and performing operations to determine the motion vectors is referred to as "motion vector prediction."

As part of HEVC motion vector prediction, the information associated with each image frame is divided into several hierarchical levels of pixel blocks. First, each image frame is divided into coding tree blocks (CTBs) that may vary in size from 16×16 pixels to 64×64 pixels. Each CTB may correspond to a single coding unit (CU) or may be recursively partitioned into four subsets of pixels to create multiple CUs (i.e., four CUs, sixteen CUs, etc.), where the size of each CU ranges from 8×8 pixels to 64×64 pixels. Similarly, each CU may correspond to a single prediction unit (PU) or may be subdivided into two, three, or four PUs, where each PU is a rectangular block of pixels. Finally, each PU is subdivided into 4×4 prediction blocks.

An HEVC codec usually performs motion vector prediction on each PU included in each CU within each CTB in an image frame. Further, as the codec processes the image frame, the codec determines prediction information (including motion vectors) for 4×4 prediction blocks within each PU. The prediction information for each prediction block is based on video information associated with the prediction block and prediction information associated with previously processed prediction blocks. In addition to motion vectors, the prediction information for each prediction block may include a variety of data for motion vector prediction, such as reference indices and flags. In operation, the codec typically uses the prediction information associated with five proximally-located "neighbor" prediction blocks. These neighbor prediction blocks include two left neighbors (A0 and A1), a top-left neighbor (B2), a top neighbor (B1), and a top-right neighbor (B0).

In one motion vector prediction technique, after computing the motion vectors for the prediction blocks in each CU, the codec stores the prediction information associated with the prediction blocks that are spatial neighbors of subsequent CUs. For instance, suppose that a CTB were to include 64×64 pixels, and a CU were to include 4×4 pixels. To store the prediction information associated with processing the CTB, the codec would store the prediction information for five neighbor prediction blocks for each of 256 CUs. Consequently, the codec would store prediction information representing a maximum of 290 4×4 prediction blocks—256 included in the CTB and 34 neighbors. Storing this quantity of data may strain the capacity of the memory resources that are locally available to the codec. Further, for each CU, the codec often updates three discrete buffers: a left neighbor buffer that includes prediction information for A0 and A1, a top neighbor buffer that includes prediction information for B0 and B1, and a top-left neighbor buffer that includes prediction info for B2. Performing the memory operations associated with repetitively storing this prediction information may unnecessarily reduce the performance of the codec and increase power consumption. As is well known, any increases in memory usage and power consumption are generally undesirable, particularly for portable handheld devices where the memory resources and acceptable power consumption may be very limited.

Accordingly, what is needed in the art is a more effective approach to motion vector prediction.

SUMMARY OF THE INVENTION

One embodiment of the present invention sets forth a computer-implemented method for computing motion vectors. The method includes determining a first index based on a location of a first block of pixels within an image frame; performing one or more read operations that access a first motion vector that is stored in a neighbor union buffer at a first address corresponding to the first index; computing a second motion vector that corresponds to the first block of pixels based on the first motion vector; determining that the first motion vector is obsolete; and performing one or more write operations that store the second motion vector in the neighbor union buffer at the first address.

One advantage of the disclosed techniques is that the video coder/decoder (codec) efficiently and flexibly stores motion vectors. In particular, since the codec identifies and replaces motion vectors that are no longer relevant with useful motion vectors, the codec stores the motion vectors in fewer entries compared to conventional codecs. Further, by flexibly accessing the neighbor union buffer, the codec reduces the number of redundant memory operations performed during motion vector prediction. Consequently, the codec consumes less power and performs motion vector prediction more efficiently than conventional codecs.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only

DETAILED DESCRIPTION

In the following description, numerous specific details are set forth to provide a more thorough understanding of the present invention. However, it will be apparent to one of skill in the art that the present invention may be practiced without one or more of these specific details.

Figure 1:
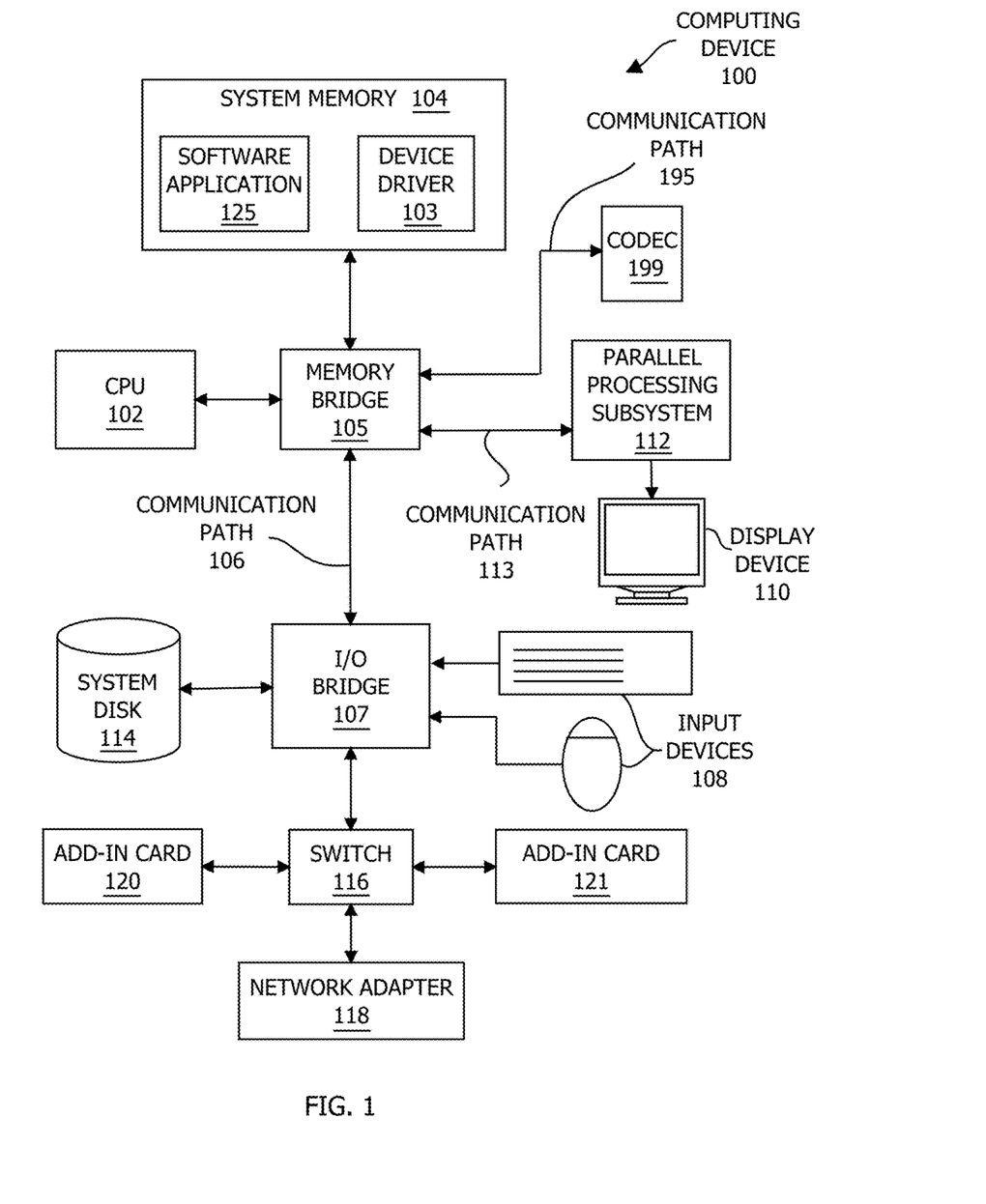
FIG. 1 is a block diagram illustrating a computing device configured to implement one or more aspects of the present invention.

FIG. 1 is a block diagram illustrating a computing device 100 configured to implement one or more aspects of the present invention. As shown, the computing device 100 includes, without limitation, a central processing unit (CPU) 102 and a system memory 104 coupled to a coder/encoder (codec) 199 via a memory bridge 105 and a communication path 195. The memory bridge 105 is further coupled to a parallel processing subsystem 112 via a communication path 113 and to an I/O (input/output) bridge 107 via a communication path 106. The I/O bridge 107 is, in turn, coupled to a switch 116.

In operation, I/O bridge 107 is configured to receive user input information from input devices 108, such as a keyboard or a mouse, and forward the input information to CPU 102 for processing via communication path 106 and memory bridge 105. Switch 116 is configured to provide connections between I/O bridge 107 and other components of the computing device 100, such as a network adapter 118 and various add-in cards 120 and 121.

As also shown, I/O bridge 107 is coupled to a system disk 114 that may be configured to store content and applications and data for use by CPU 102, parallel processing subsystem 112, and the codec 199. As a general matter, system disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices. Finally, although not explicitly shown, other components, such as universal serial bus or other port connections, compact disc drives, digital versatile disc drives, film recording devices, and the like, may be connected to I/O bridge 107 as well.

In various embodiments, memory bridge 105 may be a Northbridge chip, and I/O bridge 107 may be a Southbrige chip. In addition, communication paths 106, 113, and 195, as well as other communication paths within the computing device 100, may be implemented using any technically suitable protocols, including, without limitation, AGP (Accelerated Graphics Port), HyperTransport, or any other bus or point-to-point communication protocol known in the art.

In some embodiments, parallel processing subsystem 112 comprises a graphics subsystem that delivers pixels to a display device 110 that may be any conventional cathode ray tube, liquid crystal display, light-emitting diode display, or the like. In such embodiments, the parallel processing subsystem 112 incorporates circuitry optimized for graphics and video processing, including, for example, video output circuitry. Such circuitry may be incorporated across one or more parallel processing units (PPUs) included within parallel processing subsystem 112. In other embodiments, the parallel processing subsystem 112 incorporates circuitry optimized for general purpose and/or compute processing. Again, such circuitry may be incorporated across one or more PPUs included within parallel processing subsystem 112 that are configured to perform such general purpose and/or compute operations. In yet other embodiments, the one or more PPUs included within parallel processing subsystem 112 may be configured to perform graphics processing, general purpose processing, and compute processing operations. System memory 104 includes at least one device driver 103 configured to manage the processing operations of the one or more PPUs within parallel processing subsystem 112. The system memory 104 also includes a software application 125 that executes on the CPU 102 and may issue commands that control the operation of the PPUs.

The coder/encoder (codec) 199 is a fixed-function hardware unit that encodes and/or decodes digital video information to facilitate efficient transmission of video data between units within the computing device 100 while preserving acceptable video quality. The codec 199 may be implemented in any technically feasible fashion, such as an application specific integrated critic or a field programmable gate array. Notably, the codec 199 supports the High Efficiency Video Coding (HEVC) standard, also known as H.265. In other embodiments, the codec 199 may support other compression/decompression standards or be configured to support multiple compression/decompression standards.

Advantageously, the codec 199 is configured to optimize the memory resources of the computing device 100 while coding and/or decoding video information that conforms to the HEVC standard. In particular, the codec 199 reduces the quantity of data stored in available local memory resources compared to conventional codecs. Further, the codec 199 reduces the number of memory operations performed on this local memory compared to conventional codes. First, the codec 199 creates a fixed-sized neighbor union buffer (not shown in FIG. 1) included in the local memory. In operation, the codec 199 sequentially computes the motion vectors for blocks of pixels, known as processing units (CUs), in an image frame. As part of processing a current CU, the codec 199 performs read operations on the neighbor union buffer to access prediction information (including motion vectors) associated with previously processed CUs. After computing new prediction information corresponding to the current CU, the codec 199 identifies locations within the neighbor union buffer that store prediction information that the codec 199 does not require to compute subsequent motion vectors. The codec 199 then performs write operations on the neighbor union buffer to overwrite this obsolete prediction information with the new prediction information that the codec 199 eventually uses to compute motion vectors for unprocessed CUs.

By identifying and overwriting prediction data that is no longer relevant, the codec 199 maintains the neighbor union buffer as a constant-sized sliding window of relevant prediction information. In contrast, conventional codecs do not identify stored prediction information that is no longer relevant for unprocessed CUs and, consequently, may use substantially more local memory to compute the motion vectors of a group of CUs known as a coding tree block (CTB). Further, as is well known in the art, conventional codecs may store prediction data associated with a particular location in multiple data structures (i.e., once in a top-left neighbor buffer and once in a top neighbor buffer). Advantageously, the codec 199 stores prediction data that is associated with a particular location in the image only once—at the offset or index within the neighbor union buffer that corresponds to the location in the image.

In various embodiments, parallel processing subsystem 112 and/or the codec 199 may be integrated with one or more other the other elements of FIG. 1 to form a single system. For example, parallel processing subsystem 112 may be integrated with the CPU 102, the codec 199, and other connection circuitry on a single chip to form a system on chip (SoC).

In alternate embodiments, the codec 199 may be implemented in software instead of hardware. In such embodiments, the codec 199 may execute on the CPU 102, the parallel processing subsystem 112, and/or other processing units included in the computing device 100 in any combination. The computing device 100 may support any number of codecs 199 implemented in software, hardware, or both software and hardware that support one or more video standards and are designed to accomplish any number of video processing tasks. For instance, in some embodiments the system disk 114 may include a removable Blu-ray disc and the computing device 100 may be configured to read video data that is encoded in the HEVC standard from the Blu-ray disc. In such embodiments, the codec 199 may configure the CPU 102 and the parallel processing subsystem 112 to decode the video data and display the associated image frames sequentially on the display device 110.

It will be appreciated that the system shown herein is illustrative and that variations and modifications are possible. The connection topology, including the number and arrangement of bridges, the number of codecs 199, the number of CPUs 102, and the number of parallel processing subsystems 112, may be modified as desired. For example, in some embodiments, system memory 104 could be connected to CPU 102 directly rather than through memory bridge 105, and other devices would communicate with system memory 104 via memory bridge 105 and CPU 102. In other alternative topologies, parallel processing subsystem 112 may be connected to I/O bridge 107 or directly to CPU 102, rather than to memory bridge 105. In still other embodiments, I/O bridge 107 and memory bridge 105 may be integrated into a single chip instead of existing as one or more discrete devices. Lastly, in certain embodiments, one or more components shown in FIG. 1 may not be present. For example, switch 116 could be eliminated, and network adapter 118 and add-in cards 120, 121 would connect directly to I/O bridge 107.

Figure 2:
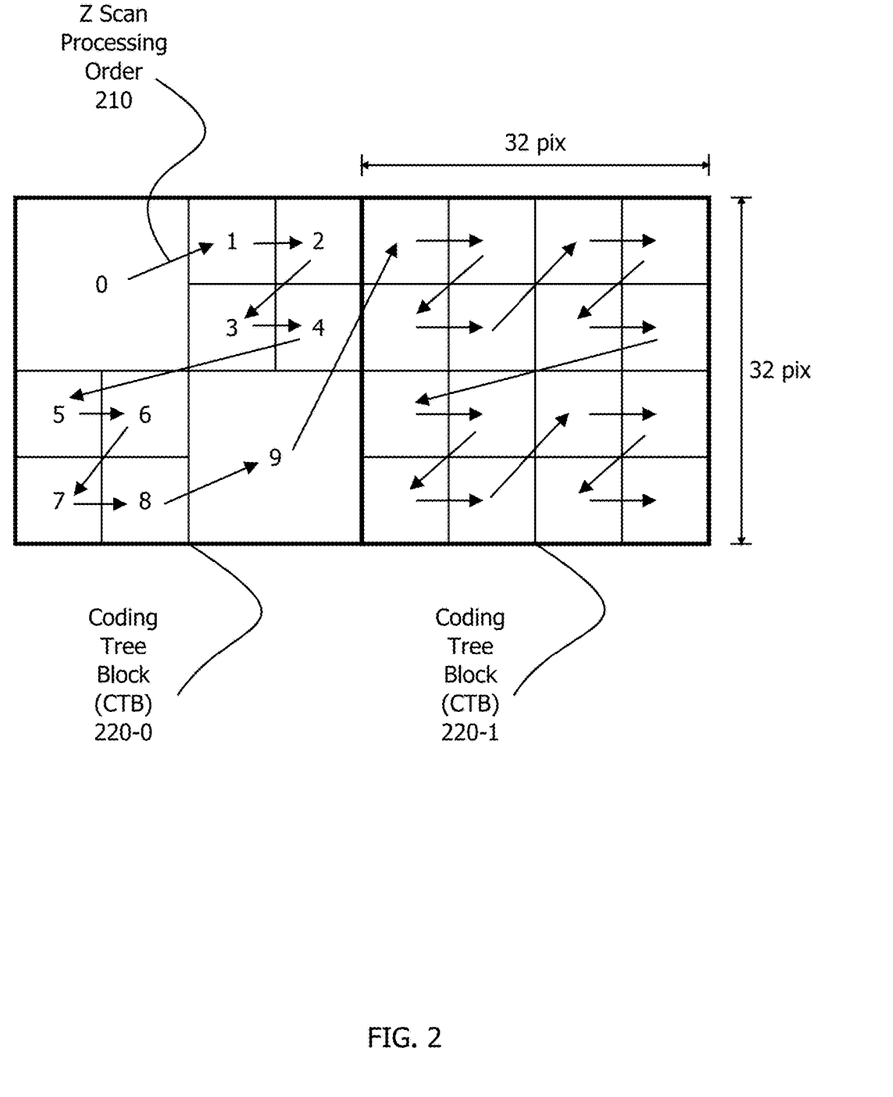
FIG. 2 is a block diagram illustrating how the coder/decoder (codec) of FIG. 1 processes coding units (CUs) associated with an image frame in a Z scan processing order, according to one embodiment of the present invention.

FIG. 2 is a block diagram illustrating how the coder/decoder (codec) 199 of FIG. 1 processes coding units (CUs) associated with an image frame in a Z scan processing order 210, according to one embodiment of the present invention. As part of HEVC motion vector prediction, the codec 199 partitions the pixels included in each image frame into a hierarchical tree of pixel blocks, including coding tree blocks (CTB) 220 and coding units (CUs). The portion of the image frame that is depicted in FIG. 2 corresponds to two CTBs 220.

In general, an image frame may include any number of CTBs 220, and each CTB 220 may vary in size from 16×16 pixels to 64×64 pixels. Further, each CTB 220 is recursively subdivided any number of times (including zero) into four sub-blocks referred to as coding units (CUs). The size of each CU ranges from 8×8 pixels to 64×64 pixels. As shown, the CTB 220-0 includes 1024 pixels that are arranged in 32 rows and 32 columns. These 1024 pixels are partitioned into nine separate CUs, depicted as numbered blocks included in the CTB 220-0. Both the CU '0' and the CU '9' include 256 pixels that are arranged in 16 rows and 16 columns. And each of the CUs '1' through '8' includes 64 pixels that are arranged in 8 rows and 8 columns. As also shown, the CTB 220-1 includes 1024 pixels that are arranged in 32 rows and 32 columns. The CTB 220-1 is partitioned into sixteen CUs that are depicted as unlabeled boxes, and each of these CUs includes 64 pixels that are arranged in 8 rows and 8 columns. Different portions of the image frame may include different numbers and sizes of CTBs 220. Further each CTB 220 may be subdivided into various sizes and combinations of CUs. For instance, a particular CTB 220 may include a single 64×64 CU, and a different CTB 220 may include 256 8×8 CUs.

In operation, the codec 199 processes a set of CTBs 220 sequentially in the Z scan processing order 210. At the CTB 220 hierarchical level, the codec 199 sequentially processes each of the CTBs 220 in a two dimensional Z pattern. Similarly, within each CTB 220, the codec 199 processes the CUs in the Z-scan processing order 210. The Z scan processing order 210 is represented in FIG. 2 as a sequence of arrows that start at the top left CU '0' in the CTB 220-0 and end at the bottom right CU in the CTB 220-1. As illustrated in FIG. 2, the codec 199 computes the prediction information associated with the CUs that are located to the left and/or above a particular CU before computing the prediction information associated with the particular CU. In alternate embodiments, the arrangement and the sizes of the pixel blocks (e.g., CTB 220 and CU) as well as the scan processing order may differ from those depicted in FIG. 2. As persons skilled in the art will recognize, the algorithms disclosed herein may be modified to accommodate such differences.

Figure 3:
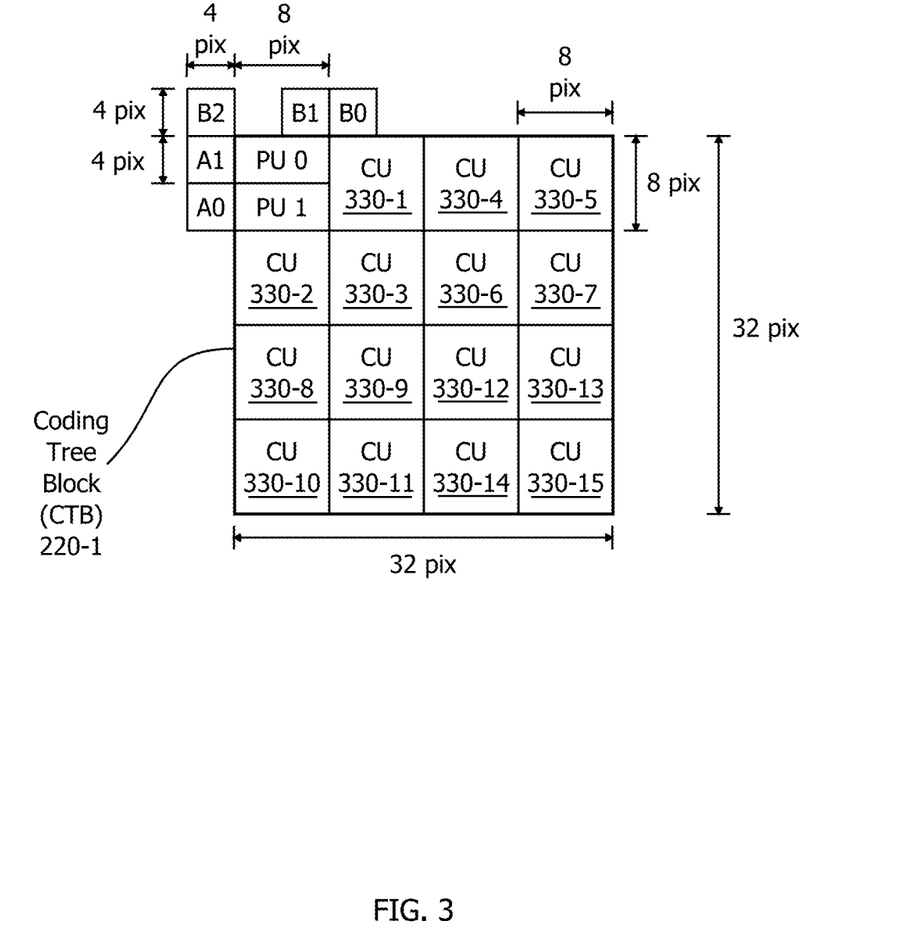
FIG. 3 is a block diagram of the coding tree block (CTB) of FIG. 2 and associated neighbor prediction blocks, according to one embodiment of the present invention.

FIG. 3 is a block diagram of the coding tree block (CTB) 220-1 of FIG. 2 and associated neighbor prediction blocks, according to one embodiment of the present invention. As outlined in FIG. 2, the CTB 220-1 is subdivided into sixteen CUs 330-0 through 330-15 that are arranged in 4 rows and 4 columns. As shown, each of the CUs 330-0 through 330-15 includes 64 pixels that are arranged in 8 rows and 8 columns.

Each CU 330 is further subdivided into 1, 2, or 4 prediction units (PUs). Notably, each PU is either a square block of pixels or a rectangular block of pixels. The size of the smallest PU is 4×4 pixels, and the size of the largest PU is 64×64. As depicted in FIG. 3, the CU 330-0 includes two 8×4 PUs, labeled 'PU-0' and 'PU 1.' In operation, the codec 199 determines prediction information (including motion vectors and ancillary information such as references and flags) for each PU. Further, within each PU, the prediction information is associated with 4×4 groups of pixels, referred to herein as "prediction blocks." Each PU includes as few as 1 and as many as 256 discrete prediction blocks The codec 199 may compute the prediction information in any technically feasible fashion. For instance the codec 199 may consider temporal differences between image frames and spatial differences between PUs in a particular image frame. For each PU, the codec 199 typically computes prediction information based, at least in part, on prediction information associated with the prediction blocks included in previously processed PUs. More specifically, as part of computing the prediction information associated with a current PU, the codec 199 may use the prediction information associated with five "neighbor" prediction blocks.

As shown, the neighbor prediction blocks for the 'PU 0' include two left neighbors (labeled 'A0' and 'A1'), a top-left neighbor (labeled 'B2'), a top neighbor (labeled 'B1'), and a top-right neighbor (labeled 'B0'). As persons skilled in the art will recognize, the top neighbor for the 'PU 0' is also the top-left neighbor of the top-left PU included in the CU 330-1.

In general, before the codec 199 performs motion vector prediction on a current CTB 220, the codec 199 ensures that a neighbor union buffer (not shown in FIG. 3) includes the relevant previously-computed prediction information. The codec 199 may obtain this prediction information in any technically feasible fashion. For instance, the codec 199 may perform copy operations that copy selected prediction information from the system memory 104 to the neighbor union buffer. The codec 199 addresses the neighbor union buffer via indices that correspond to specific neighbors of the current CTB 220. The following table summarizes such calculations for one embodiment of the invention:

| Index into neighbor union buffer | Calculation |
| --- | --- |
| Index of top-left neighbor | Index of CTB* CTB width in 4 × 4 blocks |
| Min index of top neighbors | Index of top-left neighbor + 1 |
| Max Index of top neighbors | Min index of top neighbors + CTB width in 4 × 4 blocks |
| Min index of left neighbors | Index of top-left neighbor − CTB width in 4 × 4 blocks |
| Max index of left neighbors | Index of top-left neighbor − 1 |
| Min index of top-right neighbors | Max index of top neighbors + 1 |
| Max Index of top-right neighbors | Min index of top-right neighbors + CTB width 4 × 4 blocks |

As persons skilled in the art will recognize, some indices may lie outside the range of the neighbor union buffer 410. For instance, the top-left CTB 220-0 may be located at the left edge of the image frame and, consequently, may not have any left neighbors. The algorithms and computations described herein are illustrative rather than restrictive, and may be modified according to reflect special situations without departing from the broader spirit and scope of the invention.

After performing motion vector prediction on all the CUs 330 included in a particular CTB 220, the codec 199 performs operations that enable subsequent CTBs 220 to access relevant prediction information. The codec 199 may facilitate this communication in any technically feasible fashion. For instance, the codec 199 may perform copy operations that copy selected prediction information from the neighbor union buffer to a data structure included in the system memory 104.

Figure 4:
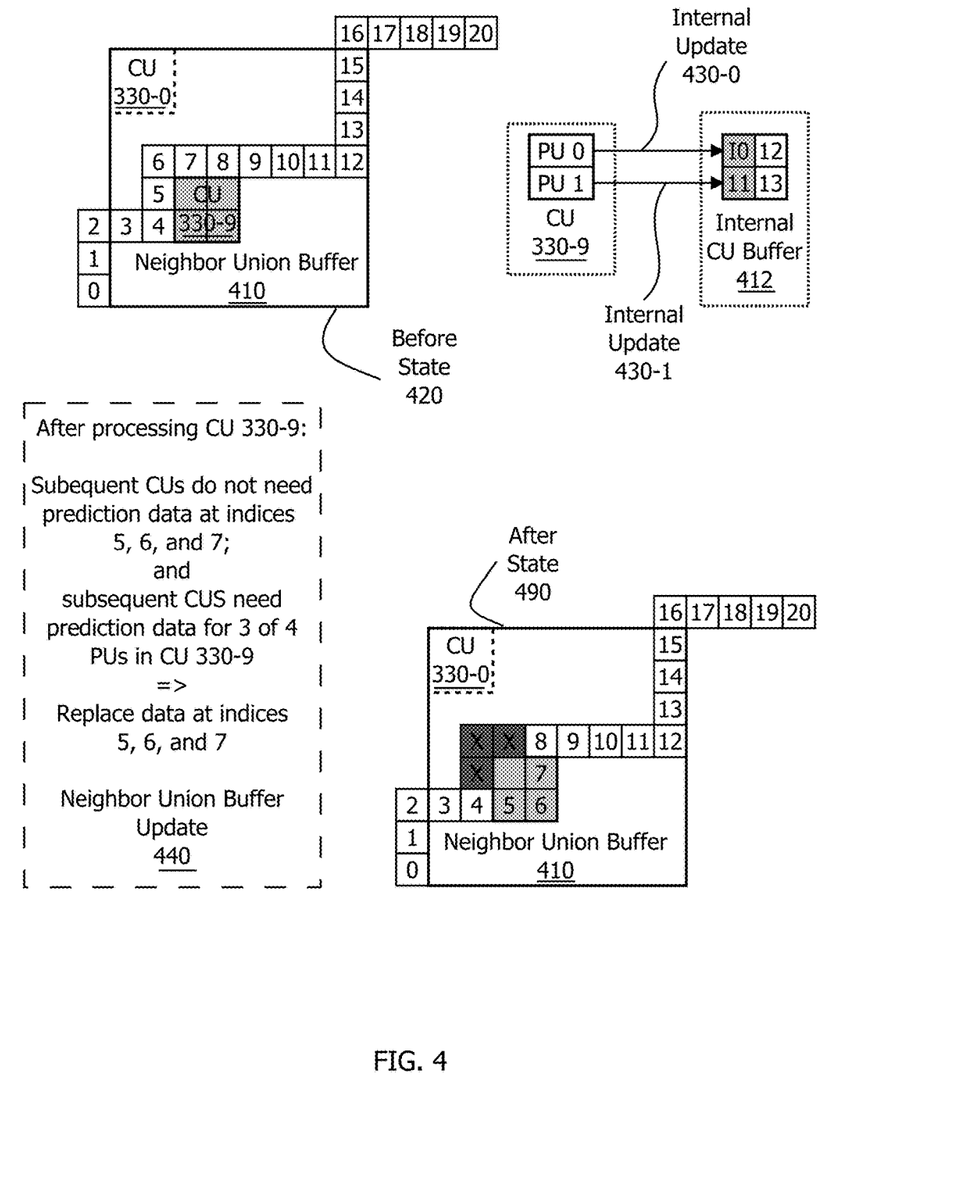
FIG. 4 is a conceptual diagram illustrating how the coder/decoder of FIG. 1 updates motion vectors included in a neighbor union buffer, according to one embodiment of the present invention.

FIG. 4 is a conceptual diagram illustrating how the coder/decoder (codec) 199 of FIG. 1 updates motion vectors included in a neighbor union buffer 410, according to one embodiment of the present invention. For explanatory purposes only, the context of FIG. 1 is that the codec is performing vector prediction on a current CU 330-9 that is the $10^{th}$ CU 330 included in the CTB 220-1 of FIG. 2.

When the codec 199 begins performing motion vector prediction on the CU 330-9, the neighbor union buffer 410 includes prediction data at indices 0 through 20. In a before state 420, the spatial locations of the prediction blocks represented in the neighbor union buffer 410 are annotated with the corresponding indices into the neighbor union buffer 410. Further, the prediction blocks included in the CU 330-9 are depicted as filled squares. As illustrated, the codec 199 maintains the neighbor union buffer 410 such that the entries included in the neighbor union buffer 410 continually "wrap around" the current CU 330.

For each PU, the codec 199 typically computes prediction information based, at least in part, on prediction information associated with the prediction blocks included in previously processed PUs. Accordingly, before computing the prediction information for a current PU in a current CU 330, the codec 199 performs read operations on the neighbor union buffer 410 to obtain previously computed prediction information for the current PU neighbors that lie outside the current CU 330. As persons skilled in the art will recognize, some neighbors of the current PUs may lie within in the current CU 330 and, therefore, are not included in the neighbor union buffer 410 before the codec 199 processes the current CU 330. For neighbors that lie within the current CU 330, the codec 199 performs read operations on an internal CU buffer 412 to obtain any available prediction information.

The internal CU buffer 412 includes four entries ('I0,' 'I1,' 'I2,' and 'I3'), corresponding to the maximum number of PUs that may be included in each CU 330. The codec 199 reuses the internal CU buffer 412 for each CU 330—resetting the entries included in the internal CU buffer 412 to a "clean" state before processing the PUs included in each CU 330. As the codec 199 processes the PUs included in the current CU 330, the codec 199 performs internal updates 430 to the internal CU buffer 412. As shown, since the CU 330-9 includes only two PUs ('PU 0' and 'PU 1'), the codec 199 performs two write operations to the internal CU buffer 412. An internal update 430-0 stores the prediction information for the 'PU 0,' and an internal update 430-1 stores the prediction information for the 'PU 1.' If the current CU 330 were to include four PUs, then the codex 199 would perform four write operations to the internal CU buffer 412.

After the codec 199 finishes processing all of the PUs included in the current CU 330, the codec 199 performs a neighbor union buffer update 440. During the neighbor union buffer update 440 for CU 330-9, the codec 199 updates the neighbor union buffer 410 with prediction data for the 'PU 0' and the 'PU 1' that will be useful for the prediction of unprocessed PUs. Advantageously, to avoid unnecessarily wasting memory resources, the codec 199 identifies the entries in the neighbor union buffer 410 that are not relevant for the prediction of unprocessed CUs 330. The codec 199 then performs copy operations that copy prediction information from the internal CU buffer 412 to the identified entries in the neighbor union buffer 410—overwriting the irrelevant prediction data. By updating the neighbor union buffer 410 in this fashion, the codec 199 maintains the neighbor union buffer 410 as a siding window of relevant prediction data.

In one embodiment, the codec 199 implements the neighbor union buffer update 440 based on the following pseudo-code:

```
//CONTEXT
// xL4, yL4 is the x and y offset of current CU in 4 pixel
//granularity, based on current CTU;
//nC4 is the size of current CU in 4 pixel granularity
//hP4tl, wP4tl is the height and width of top left PU inside current
//PU, in 4 pixel granularity.
//neighbour union buffer is nbPred[64]
//internal CU buffer is currPred[4]
//update left neighbor
For(j=0; j<nC4; j++){
    srcIdx = (j>=hP4tl)<<1 | (nC4-1)>=wp4tl;
    dstIdx = CTBIdx*CTBWidthin4x4+nC4-1+xL4-(yL4+j);
    nbPred[dstIdx] = currPred[srcIdx];
}
//update top neighbor
For(i=0; i<nC4; i++){//<nC4-1 is also fine
    srcIdx = (nC4-1>=hP4tl)<<1 | i>=wp4tl;
    dstIdx = CTBIdx*CTBWidthin4x4-(nC4-1)+xL4+i-yL4;
    nbPred[dstIdx] = currPred[srcIdx];
//topLeft Neighbor has been updated
```

As shown, after processing the CU 330-9, the codec 199 identifies that prediction information included in the internal CU buffer 412 for three of the four prediction blocks in the CU 330-9 is relevant for subsequent motion vector prediction. In addition, the codec 199 identifies that the prediction blocks represented by the entries 5, 6, and 7 in the neighbor union buffer 410 are irrelevant for subsequent motion vector prediction. Consequently, the codec 199 replaces the prediction information at the entries 5, 6, and 7 in the neighbor union buffer 410 with prediction data included in the internal CU buffer 412.

In an after state 490, the updated spatial locations of the prediction blocks represented in the neighbor union buffer 410 are annotated with the corresponding indices into the neighbor union buffer 410. As shown, three of the four prediction blocks included in the CU 330-9 are represented in the neighbor union buffer 410. By updating the neighbor union buffer 410 to represent these three prediction blocks, the codec 199 ensures that the entries included in the neighbor union buffer 410 "wrap around" the next CU 330-10 and include the appropriate prediction information for subsequent CUs 330 in the CTB 220-1.

Advantageously, by systematically pruning and flexibly addressing the data included in the neighbor union buffer 410, the codec 199 reduces both the memory consumption and the number of memory operations associated with motion vector prediction compared to conventional codecs. For instance, as described in detail above, to store prediction information associated with CU 330-9 for use by subsequent CUs 330, the codec 199 updates only three entries in the neighbor union buffer 410. Further, the codec 199 updates the prediction information for a particular prediction block a single time to the neighbor union buffer 410 and, subsequently, determines the appropriate top-left neighbor and top neighbor indices per PU based on the location of the PU. By contrast, a conventional codec typically updates three entries in a top neighbor buffer, three entries in a left neighbor, and three entries in a top-left neighbor buffer. Further, since the conventional codec maintains separate buffers, the conventional codec may update the prediction information for a particular prediction block to multiple buffers. Notably, a conventional codec may first update the prediction information for a particular prediction block to the top-left neighbor buffer for processing one CU and, subsequently, to the top neighbor buffer for processing a different CU.

The algorithms and computations described herein are illustrative rather than restrictive, and may be altered without departing from the broader spirit and scope of the invention. For instance, in alternate embodiments, the codec may not implement an internal CU buffer, and the codec may update the neighbor union buffer directly without storing prediction information in an ancillary data structure.

Figure 5A:
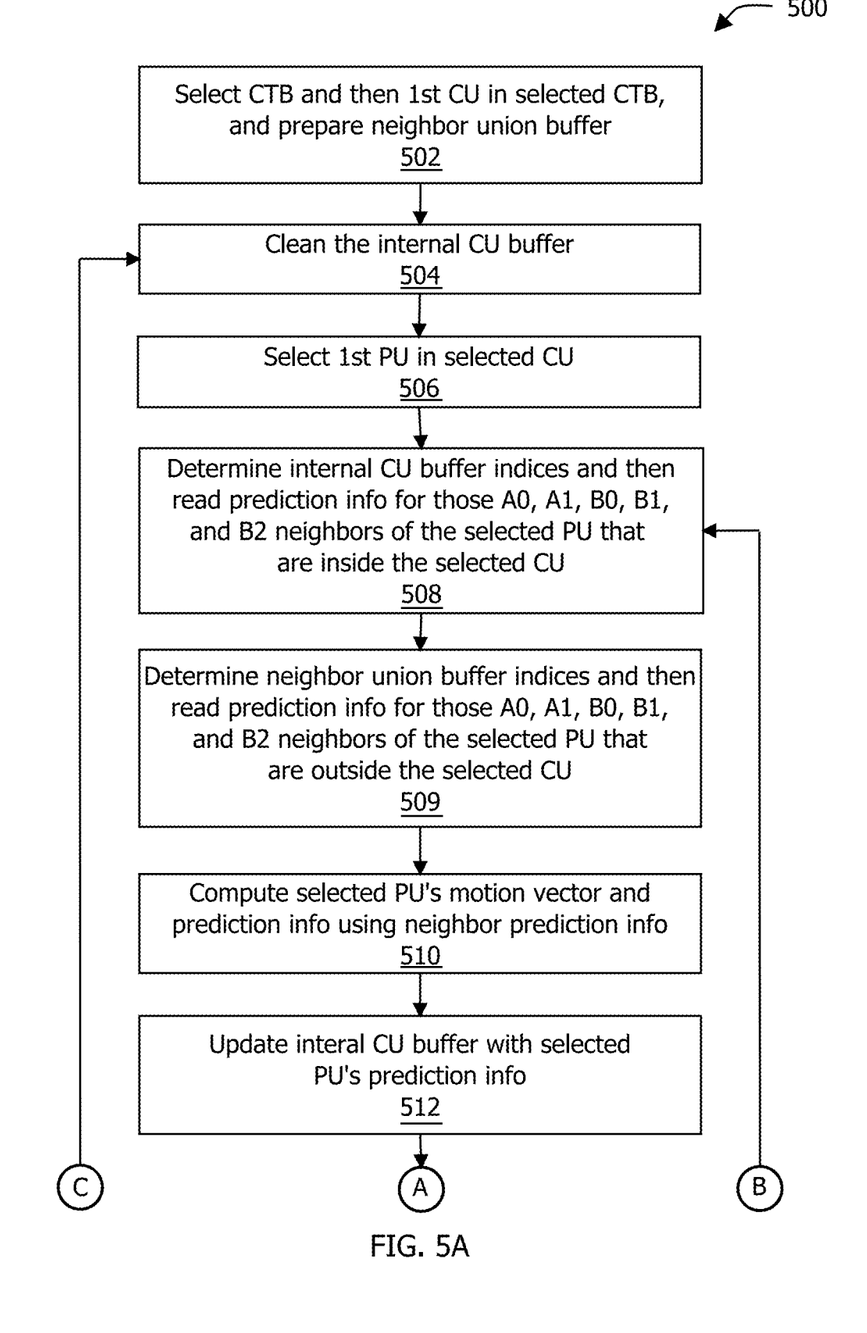
FIGS. 5A-5B set forth a flow diagram of method steps for computing motion vectors for a coding tree block, according to one embodiment of the present invention.
Figure 5B:
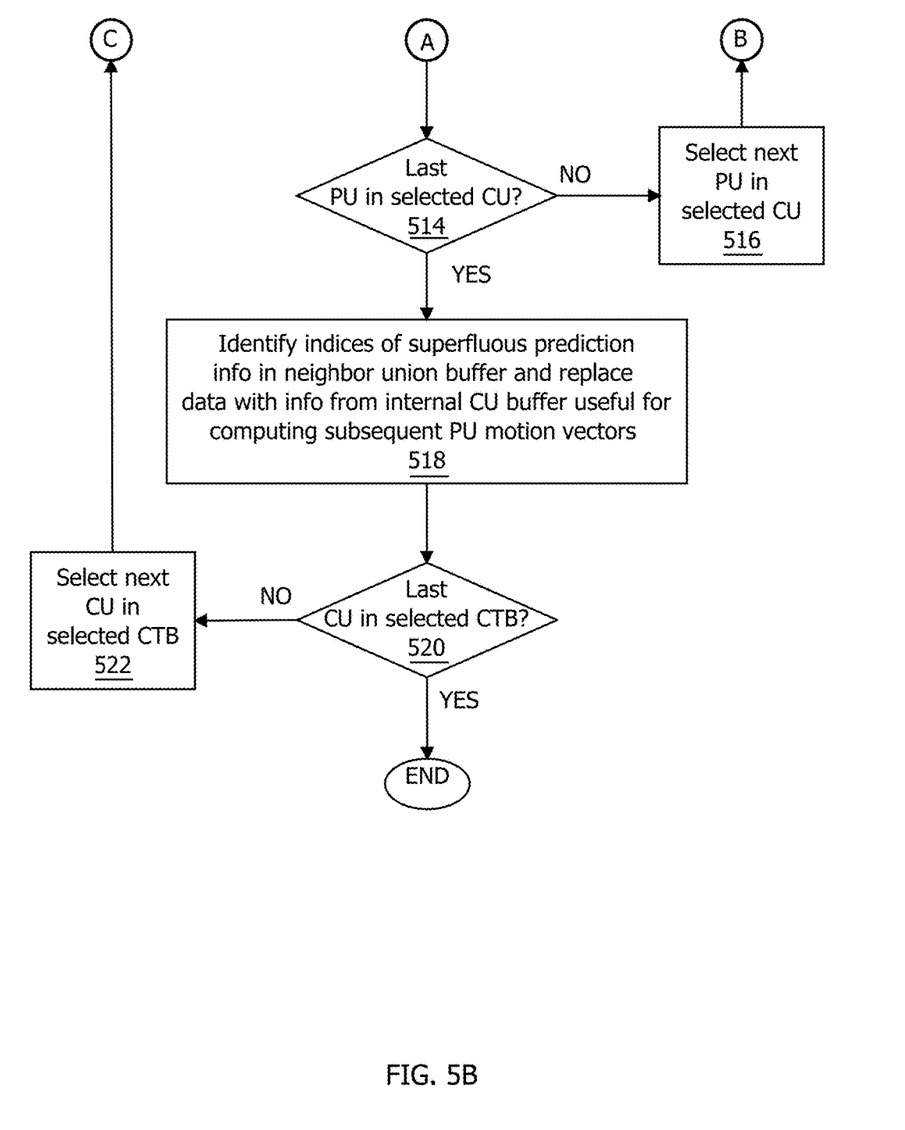

FIGS. 5A-5B set forth a flow diagram of method steps for computing motion vectors for a coding tree block, according to one embodiment of the present invention. Although the method steps are described with reference to the systems of FIGS. 1-4, persons skilled in the art will understand that any system configured to implement the method steps, in any order, falls within the scope of the present invention.

As shown, a method 500 begins at step 502, where the codec 199 selects a particular CTB 220 and the first CU 330 included in the selected CTB 220 based on the Z scan processing order 210. As part of step 502, the codec 199 ensures that the neighbor union buffer 410 includes the relevant previously-computed prediction information. The codec 199 may obtain this prediction information in any technically feasible fashion. For instance, the codec 199 may perform copy operations that copy selected prediction information from the system memory 104 to the neighbor union buffer 410. At step 504, the codec 199 resets the entries included in the internal CU buffer 412 to a "clean" state. At step 506, the codec 199 selects the first PU in the selected CU 330.

At step 508, the codec 199 computes the indices of the internal CU buffer 412 corresponding to the entries associated with the neighbor prediction blocks of the selected PU that are located within the selected CU 330. As previously disclosed herein, these neighbor prediction blocks may include any combination of two left neighbors (A0 and A1), a top-left neighbor (B2), a top neighbor (B1), and a top-right neighbor (B0). After computing the indices of the appropriate prediction blocks, the codec 199 performs read operation on the internal CU buffer 412 to obtain the relevant prediction information.

At step 509, the codec 199 computes the indices of the neighbor union buffer 410 corresponding to the entries associated with neighbor prediction blocks of the selected PU that are located outside the selected CU 330. Again, these neighbor prediction blocks may include any combination of two left neighbors (A0 and A1), a top-left neighbor (B2), a top neighbor (B1), and a top-right neighbor (B0). After computing the indices of the appropriate prediction blocks, the codec 199 performs read operation on the neighbor union buffer 410 to obtain the relevant prediction information.

At step 510, the codec 199 computes the prediction information, including motion vectors, for the selected PU. The codec 199 may compute the prediction information in any technically feasible fashion using any available information, including image frame data and the neighbor prediction information for A0, A1, B2, B1, and B0. At step 512, the codec 199 performs write operations to store the prediction information for the selected PU in the internal CU buffer 412. If, at step 514, the codec 199 determines that the selected PU is not the last PU included in the selected CU 330, then the method 500 proceeds to step 516. At step 516, the codec 199 selects the next PU included in the selected CU 330, and the method 500 returns to step 508. The codec 199 cycles through steps 508-516, sequentially processing PUs included in the selected CU 330, until the codec 199 processes the last PU included in the selected CU 330.

At step 514, if the codec 199 determines that the selected PU is the last PU included in the selected CU 330, then the method 500 proceeds to step 518. At step 518, the codec 199 identifies the indices corresponding to entries included in the neighbor union buffer 410 that include superfluous prediction information. In particular, the codec 199 identifies the entries that correspond to prediction blocks that are not neighbors to any unprocessed CUs 330. The codec 199 then performs copy operations that replace the superfluous data included in the neighbor union buffer 410 with prediction information that is both included in the internal CU buffer 412 and relevant to performing motion vector prediction on unprocessed CUs 330.

At step 520, if the codec 199 determines that the selected CU 330 is the last CU 330 included in the selected CTB 220, then the method 500 proceeds to step 522. At step 522, the codec 199 selects the next CU 330 included in the selected CTB 220, and the method 500 returns to step 504. The codec 199 cycles through steps 504-520, processing CUs 330 included in the selected CTB 220, until the codec 199 processes the last CU 330 included in the selected CTB 220. If, at step 520, the codec 199 determines that the selected CU 330 is the last CU 330 included in the CTB 220, then the method 500 terminates.

In sum, the disclosed techniques enable HEVC codecs to efficiently store and reuse prediction information (including motion vectors). In one instance, the codec maintains two data structures: a sixty-four entry neighbor union buffer designed to store prediction information across a CTB, and a four-entry internal CU buffer designed to store prediction information during processing of each CU included in the CTBs. To perform motion vector prediction, the codec processes the CTBs in Z scan order and, similarly, processes the CUs within each CTB in Z scan order. For each PU within a current CU, the codec determines the indices of the entries in the neighbor union buffer that correspond to each of the A0, A1, B0, B1, and B2 prediction blocks that are both neighbors of the PU and are located outside the current CU. Similarly, for each PU, the codec determines the indices of the entries in the internal CU buffer that correspond to each of the A0, A1, B0, B1, and B2 neighbor prediction blocks that are located inside the CU. The codec then determines the prediction information for each PU based on the neighbor prediction blocks and performs write operations that store this prediction information in the internal CU buffer. After performing motion vector prediction on each PU included in the current CU, the codec deterministically computes the indices of redundant prediction information included in the neighbor union buffer. The codec replaces the redundant prediction information with information in the internal CU buffer that is relevant to CUs that the codec has not yet processed. Consequently, the neighbor union buffer represents a sliding window of prediction information optimized to reflect the current processing location in the scan processing order.

Advantageously, the disclosed techniques enable the HEVC codec to continuously identify and replace prediction information that is no longer relevant with useful prediction information. Since the codec indexes into the union neighbor buffer based on the current PU location, each entry may correspond to any of a top neighbor, left neighbor, top-left neighbor, and top-right neighbor at any given time. By maintaining the union neighbor buffer in a deterministic and flexible fashion based on this indexing, the codec efficiently stores the useful prediction information in a total of sixty-four entries. By contrast, because conventional HEVC codecs do not replace obsolete prediction information, such codecs may use as many as 290 entries to store the prediction information associated with each CTB. Further, the codec typically updates fewer entries for each CU compared to conventional codecs, thereby increasing the performance of the codec and reducing power consumption.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as compact disc read only memory (CD-ROM) disks readable by a CD-ROM drive, flash memory, read only memory (ROM) chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons of ordinary skill in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

Therefore, the scope of embodiments of the present invention is set forth in the claims that follow.

The invention claimed is:

1. A computer-implemented method for optimizing memory resource use when computing motion vectors, the method comprising:
   determining, via a processor, a first index associated with a neighbor union buffer based on a location of a first block of pixels within an image frame, wherein the neighbor union buffer includes a plurality of addresses within a memory and has associated indices that point to different addresses included in the plurality of addresses;
   performing, via the processor, one or more read operations that access a first motion vector that is stored in the neighbor union buffer at a first address included in the plurality of addresses, wherein the first index points to the first address;
   computing, via the processor, a second motion vector that corresponds to the first block of pixels based on the first motion vector;
   determining a set of neighboring pixels that neighbor an unprocessed block of pixels in the image;
   determining, via the processor, that the first motion vector has become obsolete based on the set of neighboring pixels being distinct from a second block of pixels in the image frame that corresponds to the first motion vector; and
   performing, via the processor, one or more write operations that overwrite the first motion vector with the second motion vector in the neighbor union buffer at the first address, wherein, after overwriting the first motion vector, the second motion vector corresponds to the first index.

2. The method of claim 1, wherein the second block of pixels is located proximally to the first block of pixels within the image frame.

3. The method of claim 2, wherein each of the first block of pixels and the second block of pixels comprises a prediction block and includes four rows of four pixels.

4. The method of claim 1, further comprising:
determining a second index based on a location of a third block of pixels within the image frame, wherein the value of the second index equals the value of the first index;
performing one or more read operations that access the second motion vector that is stored in the neighbor union buffer at a second address corresponding to the second index;
computing a third motion vector that corresponds to the third block of pixels based on the second motion vector;
performing one or more write operations that store the third motion vector in an internal buffer;
computing a fourth motion vector that corresponds to a fourth block of pixels within the image frame based on the second motion vector and the third motion vector; and
performing one or more copy operations that copy the third motion vector from the internal buffer to the neighbor union buffer.

5. The method of claim 4, wherein each of the third block of pixels and the fourth block of pixels is included in a first coding unit.

6. The method of claim 4, wherein the first index is determined based on the location of a top-left neighbor of the first block of pixels, and the second index is determined based on the location of a bottom neighbor of the third block of pixels.

7. The method of claim 1, wherein the first motion vector complies with a High Efficiency Video Coding standard.

8. The method of claim 1, wherein the neighbor union buffer includes sixty-four entries.

9. A computing device for optimizing memory resource use when computing motion vectors comprising:
a memory that includes a neighbor union buffer; and
a video coder/decoder configured to:
determine a first index associated with the neighbor union buffer based on a location of a first block of pixels within an image frame, wherein the neighbor union buffer includes a plurality of addresses within the memory and has associated indices that point to different addresses included in the plurality of addresses,
perform one or more read operations that access a first motion vector that is stored in the neighbor union buffer at a first address included in the plurality of addresses, wherein the first index points to the first address,
compute a second motion vector that corresponds to the first block of pixels based on the first motion vector,
determine a set of neighboring pixels that neighbor an unprocessed block of pixels in the image;
determine that the first motion vector has become obsolete based on the set of neighboring pixels being distinct from a second block of pixels in the image frame that corresponds to the first motion vector, and
perform one or more write operations that overwrite the first motion vector with the second motion vector in the neighbor union buffer at the first address, wherein, after overwriting the first motion vector, the second motion vector corresponds to the first index.

10. The computing device of claim 9, wherein the second block of pixels is located proximally to the first block of pixels within the image frame.

11. The computing device of claim 10, wherein each of the first block of pixels and the second block of pixels comprises a prediction block and includes four rows of four pixels.

12. The computing device of claim 9, wherein the video coder/decoder is further configured to:
determine a second index based on a location of a third block of pixels within the image frame, wherein the value of the second index equals the value of the first index;
perform one or more read operations that access the second motion vector that is stored in the neighbor union buffer at a second address corresponding to the second index;
compute a third motion vector that corresponds to the third block of pixels based on the second motion vector;
perform one or more write operations that store the third motion vector in an internal buffer;
compute a fourth motion vector that corresponds to a fourth block of pixels within the image frame based on the second motion vector and the third motion vector; and
perform one or more copy operations that copy the third motion vector from the internal buffer to the neighbor union buffer.

13. The computing device of claim 12, wherein each of the third block of pixels and the fourth block of pixels is included in a first coding unit.

14. The computing device of claim 12, wherein the first index is determined based on the location of a top-left neighbor of the first block of pixels, and the second index is determined based on the location of a bottom neighbor of the third block of pixels.

15. The computing device of claim 9, wherein the first motion vector complies with a High Efficiency Video Coding standard.

16. The computing device of claim 9, wherein the neighbor union buffer includes sixty-four entries.

17. A non-transitory computer-readable storage medium including instructions that, when executed by a processing unit, cause the processing unit to optimize memory resource use when computing motion vectors by performing the steps of:
determining a first index associated with a neighbor union buffer based on a location of a first block of pixels within an image frame, wherein the neighbor union buffer includes a plurality of addresses within a memory and has associated indices that point to different addresses included in the plurality of addresses;
performing one or more read operations that access a first motion vector that is stored in the neighbor union buffer at a first address included in the plurality of addresses, wherein the first index points to the first address;
computing a second motion vector that corresponds to the first block of pixels based on the first motion vector;
determining a set of neighboring pixels that neighbor an unprocessed block of pixels in the image;
determining, via the processor, that the first motion vector has become obsolete based on the set of neighboring pixels being distinct from a second block of pixels in the image frame that corresponds to the first motion vector; and
performing one or more write operations that overwrite the first motion vector with the second motion vector in the neighbor union buffer at the first address, wherein, after overwriting the first motion vector, the second motion vector corresponds to the first index.

18. The non-transitory computer-readable storage medium of claim 17, wherein the second block of pixels is located proximally to the first block of pixels within the image frame.

19. The non-transitory computer-readable storage medium of claim 17, wherein, prior to performing the one or more write operations, the neighbor union buffer includes motion vectors associated with at least one block of pixels located proximate to the first block of pixels and to the left of the first block of pixels, at least one block of pixels located proximate to the first block of pixels and to the top of the first block of pixels, and at least one block of pixels located proximate to the first block of pixels to the top-right of the first block of pixels.

20. The non-transitory computer-readable storage medium of claim 17, wherein one or more motion vectors that are stored in the neighbor union buffer and correspond to one or more of the associated indices change as different blocks within the image frame are processed.

* * * * *